(12) United States Patent
Gomadam et al.

(10) Patent No.: US 10,805,857 B2
(45) Date of Patent: *Oct. 13, 2020

(54) MICRO-ROUTE CHARACTERIZATION AND SELECTION

(71) Applicant: Facebook, Inc., Menlo Park, CA (US)

(72) Inventors: Krishna Gomadam, San Jose, CA (US); Djordje Tujkovic, Mountain View, CA (US); Sanjai Kohli, Manhattan Beach, CA (US)

(73) Assignee: Facebook, Inc., Menlo Park, CA (US)

( * ) Notice: Subject to any disclaimer, the term of this patent is extended or adjusted under 35 U.S.C. 154(b) by 60 days.

This patent is subject to a terminal disclaimer.

(21) Appl. No.: 16/383,587

(22) Filed: Apr. 13, 2019

(65) Prior Publication Data

US 2019/0239139 A1 Aug. 1, 2019

Related U.S. Application Data

(63) Continuation of application No. 15/382,676, filed on Dec. 18, 2016, now Pat. No. 10,313,953.

(Continued)

(51) Int. Cl.
*H04W 40/12* (2009.01)
*H04B 7/06* (2006.01)
(Continued)

(52) U.S. Cl.
CPC .......... *H04W 40/12* (2013.01); *H04B 7/0617* (2013.01); *H04B 7/086* (2013.01); *H04W 16/28* (2013.01); *H04W 24/08* (2013.01)

(58) Field of Classification Search
CPC ..... H04W 24/10; H04W 16/28; H04W 24/08; H04B 7/0695
See application file for complete search history.

(56) References Cited

U.S. PATENT DOCUMENTS 8,040,856 B2 10/2011 Xia et al.
8,068,844 B2 11/2011 Li et al.
(Continued)

FOREIGN PATENT DOCUMENTS

WO WO2014104453 7/2014

OTHER PUBLICATIONS

Extended European Search Report, dated Aug. 5, 2019, Application No. 168823813-1216 / 3398262 PCT/US2016067846.
(Continued)

*Primary Examiner* — Shukri Taha
(74) *Attorney, Agent, or Firm* — Brian R. Short

(57) ABSTRACT

Apparatuses, methods, and systems for charactering and selecting micro-routes between nodes of a wireless network are disclosed. One method includes characterizing a plurality of micro-routes between the first node and the second node, wherein the plurality of micro-routes includes a micro-route and at least one other micro-route, including directing a first beam formed by antennas of the first node to a plurality of directions, for each of the plurality of directions of the first beam, directing a second beam formed by antennas of the second node to a plurality of directions, characterizing a link quality between the first node and the second node for each of the plurality of beam directions of the first beam and each of the plurality of beam directions of the second beam, classifying a plurality of clusters of characterized link qualities that include characterized link qualities greater than a threshold.

14 Claims, 13 Drawing Sheets

Related U.S. Application Data

(60) Provisional application No. 62/273,381, filed on Dec. 30, 2015.

(51) Int. Cl.
  *H04B 7/08* (2006.01)
  *H04W 16/28* (2009.01)
  *H04W 24/08* (2009.01)

(56) References Cited

U.S. PATENT DOCUMENTS

| | | | |
|---|---|---|---|
| 8,116,819 | B2 | 2/2012 | Niu et al. |
| 8,422,961 | B2 | 4/2013 | Kafle |
| 8,660,598 | B2 | 2/2014 | Prasad et al. |
| 8,706,039 | B2 | 4/2014 | Zhang et al. |
| 8,755,302 | B2 | 6/2014 | Shao et al. |
| 8,830,943 | B2 | 9/2014 | Negus et al. |
| 9,215,644 | B2 | 12/2015 | Kohli |
| 9,277,480 | B2 | 3/2016 | Kohli |
| 9,294,163 | B2 | 3/2016 | Kim |
| 9,374,140 | B2 | 6/2016 | Salonidis et al. |
| 9,648,547 | B1 | 5/2017 | Hart et al. |
| 9,794,854 | B2 | 10/2017 | Hart et al. |
| 9,893,786 | B2 | 2/2018 | Kasher et al. |
| 9,900,196 | B2 | 2/2018 | Tarighat Mehrabani et al. |
| 9,998,184 | B2 | 6/2018 | Kasher et al. |
| 10,148,557 | B2 | 12/2018 | Gomadam et al. |
| 10,425,910 | B1 | 9/2019 | Pajovic et al. |
| 2007/0263572 | A1 | 11/2007 | Ren et al. |
| 2010/0056062 | A1 | 3/2010 | Zhang et al. |
| 2010/0080119 | A1 | 4/2010 | Ansorge |
| 2010/0164802 | A1 | 7/2010 | Li et al. |
| 2011/0110453 | A1* | 5/2011 | Prasad .................. H04B 7/088 375/285 |
| 2011/0159821 | A1* | 6/2011 | Park ..................... H04B 7/0617 455/69 |
| 2012/0020222 | A1 | 1/2012 | Nishiok Jun |
| 2012/0287797 | A1 | 11/2012 | Basson et al. |
| 2013/0089042 | A1 | 4/2013 | Negus |
| 2013/0095874 | A1* | 4/2013 | Moshfeghi ............... H04B 1/40 455/509 |
| 2013/0121178 | A1* | 5/2013 | Mainaud ................ H04L 43/08 370/252 |
| 2014/0286251 | A1 | 9/2014 | Kohli |
| 2015/0244769 | A1 | 8/2015 | Khaimov |
| 2016/0020844 | A1 | 1/2016 | Hart et al. |
| 2016/0156490 | A1 | 6/2016 | Tarighat Mehrabani et al. |
| 2017/0156066 | A1 | 6/2017 | Shiotani |
| 2017/0195215 | A1 | 7/2017 | Gomadam et al. |
| 2018/0042000 | A1 | 2/2018 | Zhang et al. |
| 2018/0199212 | A1 | 7/2018 | Lin et al. |
| 2018/0367198 | A1 | 12/2018 | Jian |
| 2019/0123996 | A1 | 4/2019 | Gomadam et al. |

OTHER PUBLICATIONS

Communication Pursuant to Article 94(3), European Examination, dated Jun. 9, 2020, Application No. 16882381.3-1216 / 3398262 PCT/US2016067846.

PCT/US2016/067846; PCT International Search Report, dated Apr. 12, 2017.

PCT/US2016/067846; Written Opinion of the International Searching Authority, dated Apr. 12, 2017.

* cited by examiner

Multiple Beam Direction Settings of First Node

|   | 1 | 2 | 3 | 4 | 5 | 6 | 7 | 8 | 9 | 10 | 11 | 12 |
|---|---|---|---|---|---|---|---|---|---|----|----|----|
| 1 | X | X | X | X | X | X | X | X | X | X | X | X |
| 2 | X | V7 | X | V8 | X | V9 | X | X | X | X | X | X |
| 3 | X | X | X | X | X | X | X | X | X | X | X | X |
| 4 | V6 | X | X | X | X | V4 | X | X | X | X | X | X |
| 5 | X | X | X | X | X | X | X | X | X | X | X | X |
| 6 | X | X | X | V2 | X | V1 | X | V3 | X | X | X | X |
| 7 | X | X | X | X | X | X | X | X | X | X | X | X |
| 8 | X | X | X | X | X | V5 | X | X | X | X | X | X |
| 9 | X | X | X | X | X | X | X | X | X | X | X | X |
| 10 | X | X | V12 | X | X | X | X | X | X | X | X | X |
| 11 | X | X | V11 | V13 | X | X | X | X | X | V10 | X | X |
| 12 | X | X | X | X | X | X | X | X | X | X | X | X |

Multiple Beam Direction Settings of Second Node

FIGURE 3

Multiple Beam Direction Settings of First Node

|   | 1 | 2 | 3 | 4 | 5 | 6 | 7 | 8 | 9 | 10 | 11 | 12 |
|---|---|---|---|---|---|---|---|---|---|----|----|----|
| 1 | X | X | X | X | X | X | X | X | X | X | X | X |
| 2 | X | V7 | X | V8 | X | V9 | X | X | X | X | X | X |
| 3 | X | X | X | X | X | X | X | X | X | X | X | X |
| 4 | V6 | X | X | X | X | V4 | X | X | X | X | X | X |
| 5 | X | X | X | X | X | X | X | X | X | X | X | X |
| 6 | X | X | X | V2 | X | V1 | X | V3 | X | X | X | X |
| 7 | X | X | X | X | X | X | X | X | X | X | X | X |
| 8 | X | X | X | X | X | V5 | X | X | X | X | X | X |
| 9 | X | X | X | X | X | X | X | X | X | X | X | X |
| 10 | X | X | V12 | X | X | X | X | X | X | X | X | X |
| 11 | X | X | V11 | V13 | X | X | X | X | X | V10 | X | X |
| 12 | X | X | X | X | X | X | X | X | X | X | X | X |

Multiple Beam Direction Settings of Second Node

FIGURE 5

At time = T1

| Micro-route | Measure Link Quality | Measured Level of Correlation with Micro-route1 |
|---|---|---|
| Micro-route 1 | Q1 | XXXX |
| Micro-route 2 | Q2 | C1 |
| Micro-route 3 | Q3 | C2 |
| Micro-route 4 | Q4 | C3 |
| Micro-route 5 | Q5 | C4 |

At time = T2

| Micro-route | Measure Link Quality | Measured Level of Correlation with Micro-route1 |
|---|---|---|
| Micro-route 1 | Q1 | XXXX |
| Micro-route 2 | Q2 | C1' |
| Micro-route 3 | Q3 | C2' |
| Micro-route 4 | Q4 | C3' |
| Micro-route 5 | Q5 | C4' |

MICRO-ROUTE CHARACTERIZATION AND SELECTION

RELATED APPLICATIONS

This patent application is a continuation of U.S. patent application Ser. No. 15/382,676, filed Dec. 18, 2016, which claims priority to U.S. Provisional Patent Application Ser. No. 62/273,381 filed Dec. 30, 2015, which is herein incorporated by reference.

FIELD OF THE DESCRIBED EMBODIMENTS

The described embodiments relate generally to wireless communications. More particularly, the described embodiments relate to systems, methods and apparatuses for charactering and selecting micro-routes between nodes of a wireless network.

BACKGROUND

Wireless communication of wireless networks is susceptible to interference and failure of wireless links between nodes of the wireless networks.

It is desirable to have methods, apparatuses, and systems for charactering and selecting micro-routes between nodes of a wireless network.

SUMMARY

An embodiment includes a method. The method includes characterizing a plurality of micro-routes between the first node and the second node, wherein the plurality of micro-routes includes a micro-route and at least one other micro-route, including directing a first beam formed by a plurality of antennas of the first node to a plurality of directions, for each of the plurality of directions of the first beam, directing a second beam formed by a plurality of antennas of the second node to a plurality of directions, characterizing a link quality between the first node and the second node for each of the plurality of beam directions of the first beam and each of the plurality of beam directions of the second beam, and identifying and classifying a plurality of clusters of characterized link qualities that include characterized link qualities greater than a threshold.

Another embodiment includes a wireless network. The wireless network includes a controller operative to characterize a plurality of micro-routes between a first node and a second node, wherein the plurality of micro-routes includes a first micro-route and the at least one other micro-route, including the controller operating to direct a first beam formed by a plurality of antennas of the first node to a plurality of directions, for each of the plurality of directions of the first beam, direct a second beam formed by a plurality of antennas of the second nodes to a plurality of directions, characterize a link quality between the first node and the second node for each of the plurality of beam directions of the first beam and each of the plurality of beam directions of the second beam, identify and classify a plurality of clusters of characterized link qualities that include characterized link qualities greater than a threshold.

Other aspects and advantages of the described embodiments will become apparent from the following detailed description, taken in conjunction with the accompanying drawings, illustrating by way of example the principles of the described embodiments.

BRIEF DESCRIPTION OF THE DRAWINGS

FIG. 3 shows a table of measured qualities of micro-routes, according to an embodiment.

FIG. 5 shows a table of measured qualities of micro-routes, and further shows measured qualities that could represent a primary lobe and side lobes of a beam-formed signal, according to an embodiment.

FIG. 7 shows a first table that lists a measured link quality for each of five micro-routes, and lists a level of correlation with a first micro-route at a time T1, a second table that lists a measured link quality for each of the five micro-routes, and lists a level of correlation with a first micro-route at a time T2, according to an embodiment.

DETAILED DESCRIPTION

Figure 1A:
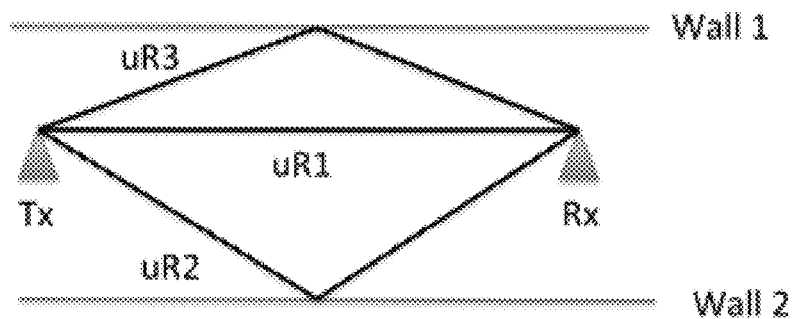
FIG. 1A shows a transmitter and a receiver of a wireless network, wherein micro-routes are formed between the first node and the second node, according to an embodiment.

The embodiments described include methods, apparatuses, and systems for characterizing a plurality of micro-links between a first node and a second node of a wireless network. For an embodiment, once characterized, one or more of the characterized micro-routes is selected for wireless communication between the first node and the second node. For an embodiment, upon detecting a condition (for an embodiment, the condition indicates performance of the micro-route of below a threshold) of a micro-route that is being used to wirelessly communicated between nodes of the wireless network, a different micro-route is selected based on a level of correlation between the micro-route and the different micro-route.

Micro-Routes

Micro-routes are transmission paths that are formed between wireless nodes of a wireless network. Due to real-world conditions, direct and reflective transmission paths (micro-routes) can be formed between the wireless nodes. The micro-routes can change over time, wherein some micro-routes disappear and other are formed as conditions and the environment between the wireless nodes changes. Generally, some micro-routes are correlated (that is, the micro-routes are similar in that the same effects (such as, interference) influence the performance of wireless communication through the micro-routes), and some micro-routes are not correlated (that is, correlated less than a threshold). For an embodiment, when a micro-route is being used for wireless communication, and that micro-route suffers from a performance degrading effect, a different (new) micro-route is selected to replace the micro-route, wherein the selection of the different micro-route is made based on the level of correlation of the micro-route to the difference micro-route. The less correlated the different micro-route is to the previously selected or used micro-route, the less likely the different route is to be suffering from the same performance degrading effects.

Micro-Route Analytics

Micro-route analytics deals with the processing of micro-routes. For an embodiment, the processing of micro-routes includes the identification of the micro-routes, and characterization of the identified micro-routes. For an embodiment, the micro-route analytics is performed at an upstream server that is connected to the wireless nodes, such as, at a cloud controller. For an embodiment, the micro-route analytics is performed at a link level, for example, at one or more of the wireless nodes. For an embodiment, the micro-route analytics is jointly performed through the interaction between the cloud controller and a local LA (link analytics) module at the transmit portion of the link. At least some of the described embodiments include processing for selecting, ordering and weeding out micro-routes to be used at the link level.

Micro-Route Correlation Detection

Micro-route correlation detection refers to the mapping of beamforming vector combinations to the actual physical paths of the link. By a definition, a micro-route is synonymous with one of available propagation paths of the channel. A micro-route can correspond to a physical path, which can be either a line of sight path or a reflection of order one or more. Also, due to the geometry and the type of environment, two unique paths (micro-routes) in the link can be correlated. For an embodiment, an analytics module residing in the cloud or one or more of the wireless nodes identifies the level of correlation between micro-routes of a link between the wireless nodes. For an embodiment, correlation between identified micro-routes is determined by testing different micro-routes over time, and determining similarities of the performance, and variations of the performance of the different micro-routes. The less the similarities, the less the correlation between different micro-routes.

For at least some embodiments, the micro-routes between the transmitting node and the receiving node are monitored over time. That is, the performance of the micro-routes is re-characterized repeatedly over time. For at least some embodiments, the level of correlation between the different micro-routes is determined by determining variations in the performance (for example, measured link quality) between the different micro-routes over the repeated characterizations. That is, the correlation determination includes determining whether the performance of the different micro-routes changes similarly or differently over time. The more correlated different micro-routes are, the more similar variations in the performance of the micro-routes. The less correlated the different micro-routes are, the less similar the variation in the performance of the micro-routes. Statistical processes can be used to determine the similarity or difference between different micro-routes over time by comparing the performance of the different micro-route over the repeated characterization of the performance of the different micro-routes over time.

For at least some embodiments, the correlation between different micro-routes is determined by determining how the performance of the different micro-routes is affected by a change in a network condition. Exemplary network conditions include the introduction or the elimination of one or more interfering signals, a change in network topology (such as, the addition or removal of a network node, or the change of location of a network node), a change in the environment around or surrounding the wireless network (such as, movement of, addition of, or subtraction of a physical object). If the different micro-routes are correlated, then the change in the network condition will change the performance of the different micro-routes similarly. If the different micro-routes are not correlated, then the change in the network condition will change the performance of the different micro-routes differently. Statistical processes can be used to determine the similarity or difference between different micro-routes with changes in the network conditions.

Identifying Micro-Routes

FIG. 1A shows a transmitter and a receiver of a wireless network, wherein micro-routes are formed between the first node (Tx) and the second node (Rx), according to an embodiment. As shown, three physical paths (uR1, uR2, uR3) exist between the transmitter (Tx) and the receiver (Rx). Each of the three physical paths (micro-routes) includes an angle of departure (AoD) from the transmitter (Tx) and angle of arrival (AoA) to the receiver (Rx).

For at least some embodiments, each of the transmitter (Tx) and the receiver (Rx) include a plurality of antennas, and are operable to form directional beams. The right combinations of transmit antenna beam and receiver antenna beam directions excites one of the micro-routes if, for example, a main lobe of a beam formed by the plurality of antennas of the transmitter (Tx) is directed in the vicinity of the AoD of the excited micro-route and a main lobe of a beam formed by the plurality of antennas of the receiver (Rx) is directed in the vicinity of the AoA of the excited micro-route.

For an embodiment, at the link layer (at the nodes), a beamforming acquisition procedure identifies all the beam combinations that can establish the link between the transmitting node and the receiving node. For an embodiment, at the system level (for example, controlled by a cloud server that is connected through a network to the transmitting node and the receiving node) the beamforming acquisition procedure identifies all the beam combinations that can establish the link between the transmitting node and the receiving node.

Figure 1B:
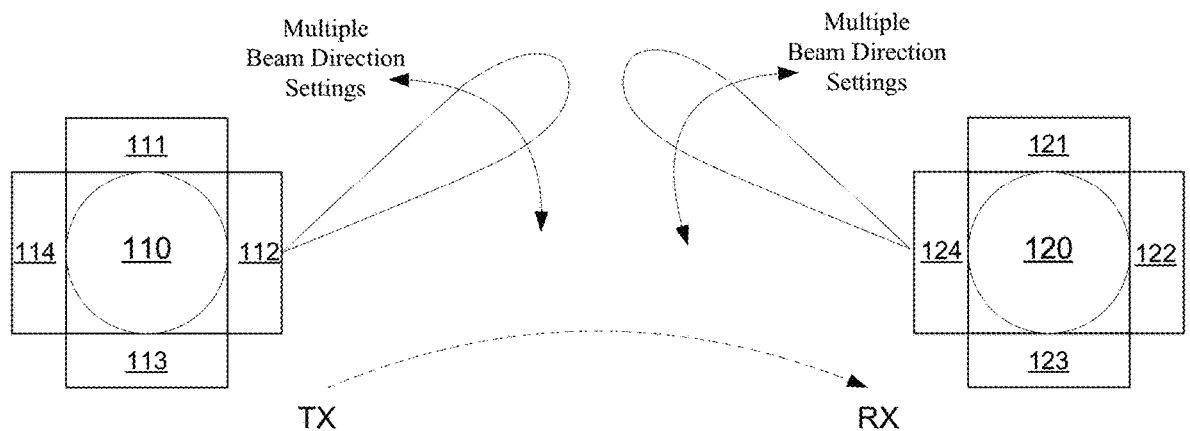
FIG. 1B shows a first node and a second node of a wireless network, wherein micro-routes between the first node and the second node are characterized, according to an embodiment.

FIG. 1B shows a first node 110 and a second node 120 of a wireless network, wherein micro-routes between the first node 110 and the second node 120 are characterized, according to an embodiment. For an embodiment, the first node 110 (transmitting node) includes multiple antennas and transmits a beam-formed signal. A direction of the beam-formed signal of the first node 110 is adjusted to multiple direction settings. That is, the AoD of the beam-formed signal of the first node 110 is different for each of the multiple direction settings. For an embodiment, the multiple direction setting includes sweeping the AoD of the first node 110 over multiple angles (multiple AoDs).

For at least some embodiments, the first node 110 and the second node 120 include multiple sectors 111, 112, 113, 114, 121, 122, 123, 124. For at least some embodiments, each sector includes a radio. Further, for an embodiment, each sector includes multiple antennas that are operative to form beams.

For an embodiment, for each multiple beam direction settings of the beam-formed signal of the first node 110, a beam-formed direction of the second node (receiving node) 120 is adjusted to multiple direction settings. For each setting of the beam-formed signal of the first node 110 and beam-formed direction of the second node 120, a link quality characterization between the first node 110 and the second node 120 is made. For an embodiment, the transmitting node 110 transmits an equivalent signal at each of the beam-formed directions of the first (transmitting) node 110. The receiving node 120 then measures a received signal level at each of the beam-formed directions of the second (receiving) node.

For an embodiment, a matrix is generated based on the beam-formed directions of the transmitting node and the beam-formed direction of the receiving node. This matrix can be a two dimensional matrix and a three dimensional matrix. For an embodiment, the number of elements of the matrix is dependent upon the number of beam-formed directions of the transmitting node and the number of beam-formed directions of the receiving node.

Channel and System Model Between Wireless Nodes

For an embodiment, an analog N×N multipath channel H between the two N-element antenna arrays (that is, two node (transmitting node and receiving node) having N antenna elements) is given by:

$$H(\tau) = \sum_{l=1}^{L} \alpha(l) v(\theta_R(l)) v^H(\theta_T(l)) \delta(\tau - \tau(l))$$

where, l Is the path index, $\alpha(l)$ is the complex coefficient of the path which captures the relative magnitude and phase of path l, $\theta_R(l)$ is the DFT (Discrete Fourier Transform) angle corresponding to the angle of arrival of path l at the receive array, $\theta_T(l)$ is the DFT angle corresponding to the angle of departure of path l at the receive array, $\tau(l)$ is the relative time delay of path l, and $\upsilon(\theta)$ is a DFT vector with the nth entry being $\exp(jn\theta)$.

For an embodiment, mapping to a DFT angle (angular frequency) and the physical direction is related to the array parameters and is expressed as $\theta = 2\pi d/\lambda \cos A_p$ where $A_p$ is the physical direction of arrival/departure in reference to the orientation of the array.

For a given combination of beam formers, $\{w_T, w_R\}$ at tx and rx, The input-output relationship for the link can be written as $$y(t) = x(t) * \{w_R^H H(t) w_T\} + n(t)$$

Now considering geometric beamforming at both Tx and Rx. The geometric beamforming satisfies the DFT structure as well. For tx beamforming at angular frequency $\phi_T$ and rx beamforming at angular frequency $\phi_R$, the effective signal component is given by $$v^H(\phi_R) H(\tau) v(\phi_T) =$$

$$\sum_{l=1}^{L} \alpha(l) \{v^H(\phi_R) v(\theta_R(l))\} \{v^H(\theta_T(l)) v(\phi_T)\} \delta(\tau - \tau(l)) = \sum_{l=1}^{L} \alpha(l)$$

$$\exp\left(\frac{(N-1)(\Delta_T(l) + \Delta_R(l))}{2}\right) \mathrm{sinc}(N\Delta_T(l)) \mathrm{sinc}(N\Delta_R(l)) \delta(\tau - \tau(l))$$

where $$\Delta_T(l) = \phi_T - \theta_T(l)$$

$$\Delta_R(l) = \theta_R(l) - \phi_R$$

$$\mathrm{sinc}(N\Delta) = \frac{\sin(N\Delta/2)}{\sin(\Delta/2)}$$

It is to be noted that the above analysis does not take into account any differential response due to change in the elevation angle of different paths (example: ground bounce). This means either the antenna response is flat across the elevation angle, or paths have the same elevation angle.

For an embodiment of an antenna array, which doesn't steer across elevation dimension, by capturing the effect of elevation in the complex coefficient of the path $\alpha(l)$, the effect of elevation can be appropriately modeled as follows:

$$H(\tau) = \sum_{l=1}^{L} \alpha(l, \psi_T(l), \psi_R(l)) v(\theta_R(l)) v^H(\theta_T(l)) \delta(\tau - \tau(l))$$

Even for ground bounce where azimuth beamforming is optimal, the elevation response is attenuated to a considerable extent in addition to the attenuation caused by the reflection. For example, in one of the worst cases of ground bounce effect where the antenna height is only 5 m and distance 200 m, the elevation angle will be approximately 3 degrees. With antenna array of elevation HPBW of about 10 degrees, the antenna pattern at both ends jointly can suppress the ground bounce by at least 3 dB. Also, the ground reflection is expected to be at least 2 dB resulting in a minimum suppression of at least 5 dB.

For an established beam combination, it can be seen that only one micro-route will be predominantly excited. Here the effective channel is approximated as $$h(\tau) \approx$$

$$\alpha(l^*) \exp\left(\frac{(N-1)(\Delta_T(l^*) + \Delta_R(l^*))}{2}\right) \mathrm{sinc}(N\Delta_T(l^*)) \mathrm{sinc}(N\Delta_R(l^*)) \delta(\tau - \tau(l^*))$$

where l* represents the index of the significant physical path that was excited by the beamformer.

Figure 2A:
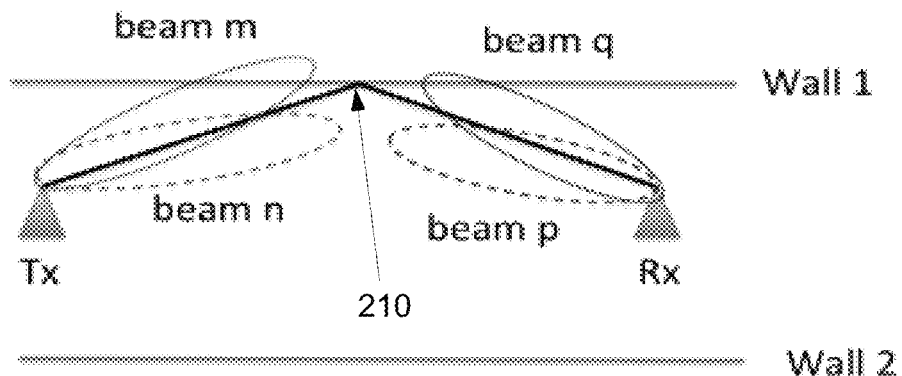
FIG. 2A shows a transmitter and a receiver of a wireless network, wherein a single micro-route can be formed between the first node and the second node for multiple beam directions, according to an embodiment.

FIG. 2A shows a transmitter (Tx) and a receiver (Rx) of a wireless network, wherein a single micro-route 210 can be formed between the first node (TX) and the second node (RX) for multiple beam directions, according to an embodiment. That is, for example, FIG. 2A shows two different beam directions (m, n) of the TX and two different beam directions (q, p) of the RX. It is possible that different of these combinations of directions excite the same micro-route 210. An embodiment includes clustering the measured responses of multiple beam directions which correspond with a single micro-route. That is, multiple beam directions of the transmitting node and multiple beam directions of the receiving node can excited the same micro-route. At least some embodiments include clustering the measured responses of the multiple beam directions into a single identified micro-route.

Figure 2B:
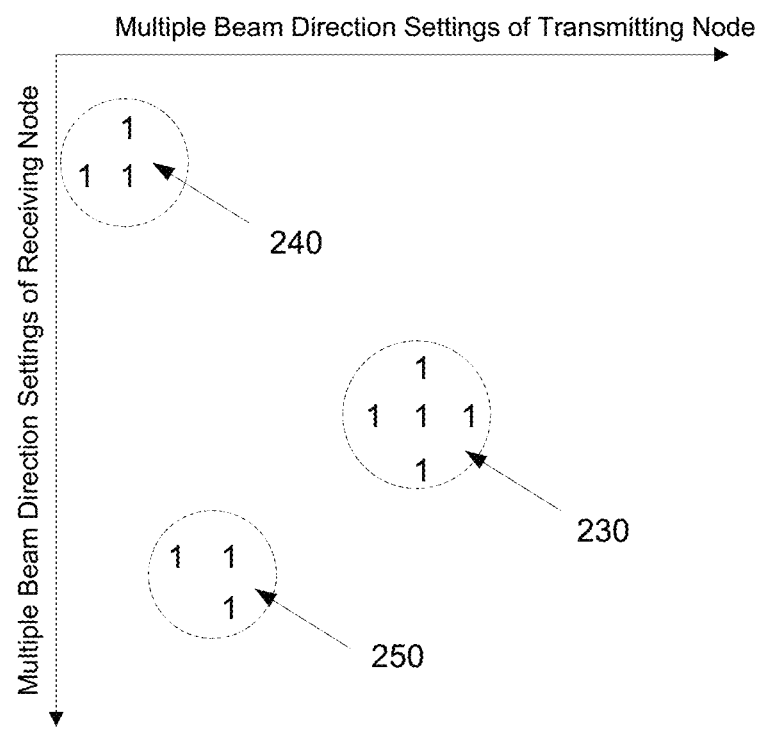
FIG. 2B shows micro-routes being identified by clustering measured link qualities for multiple beam directions, according to an embodiment.

FIG. 2B shows micro-routes being identified by clustering measured link qualities for multiple beam directions, according to an embodiment. The number "1" depicted in FIG. 2B represent link quality measurements greater than a threshold. If a measurement is less than the threshold, a "1" is not indicated. A first cluster 230 includes multiple link quality measurements for a first set of transmit beam directions and receive beam directions. The measurements within the clusters are related as having link qualities greater than a link quality threshold, and as having very similar (within a threshold) beam setting directions.

A second cluster 240 includes multiple link quality measurements for a second set of transmit beam directions and receive beam directions. A third cluster 250 includes multiple link quality measurements for a second set of transmit beam directions and receive beam directions.

For at least some embodiments, clustering multiple link quality measurements includes generating a link quality matrix based on link quality measurements between a transmitting node and a receiving node for multiple transmit beam directions (multiple AoDs) and for multiple receive beam directions (multiple AoAs). Further, the clustering includes identifying link quality measurements having a quality better than a quality threshold. Further, link quality measurements of greater than the threshold and within an AoD range threshold and within an AoA range threshold are clustered, and each cluster is identified as a single micro-link. That is, as shown in FIG. 2A, a single micro-route may be formed between the transmitting node (Tx) and the receiving node (Rx) for a small (threshold) range of variations of the AoD and a small (threshold) range of variations of the AoA. For an embodiment, the measured link qualities for small (less than a threshold) of variations of AoD and AoA having a link quality better than the quality threshold are clustered, and designated as a single micro-route. Once clustered, the described embodiments further include classifying the different identified clusters (micro-routes) as side-lobes of a micro-route or as separate micro-routes.

Classifying Clusters

For an embodiment, a cluster includes just a single link quality measurement of a single transmitter AoD and a single receiver AoA. For an embodiment, a cluster includes multiple link quality measurements of multiple transmitter AoD(s) and multiple receiver AoA(s).

At least some embodiments include processing based on deterministic aspects of the link geometry. At least some embodiments include one or more of the following assumptions. A first assumption includes assuming a link budget is such that only main-lobe of the array pattern (at least on one side) can establish the link. A second assumption includes assuming that at most, only one physical propagation path can be excited with any beam combination. For some embodiments with ground bounce, there can be two paths, but the ground bounce path is at least 5 dB lower. For at least some embodiments, ground bounce is still considered separately in the analysis. A second assumption includes assuming with a CPHY, a minimum SNR of −8 dB is required to establish the link. Assuming 10 dB requirement for MCS 8 (modulation and coding scheme 8), there is a margin of 18 dB to establish the link.

Assume that a beam combination $(\phi_{T1}, \phi_{R1})$ excites a particular Azimuth path 1*, $$h(\tau) \approx \alpha(l^*)\exp\left(\frac{(N-1)(\phi_{T1}-\theta_T(l^*)+\theta_R(l^*)-\phi_{R1})}{2}\right)$$
$$\operatorname{sinc}(N\Delta_T(l^*))\operatorname{sinc}(N\Delta_R(l^*))\delta(\tau-\tau(l^*))$$

The magnitude and phase terms are $$G(\phi_{T1},\phi_{R1}) = |\alpha(l^*)|\operatorname{sinc}(N(\phi_{T1}-\theta_T(l^*)))\operatorname{sinc}(N(\theta_R(l^*)-\phi_{R1}))$$
$$P(\phi_{T1},\phi_{R1}) = \angle\alpha(l^*) + \frac{(N-1)(\phi_{T1}-\theta_T(l^*)+\theta_R(l^*)-\phi_{R1})}{2}$$

With a different beam combination $(\phi_{T2}, \phi_{R2})$, $$G(\phi_{T2},\phi_{R2}) = |\alpha(l^*)|\operatorname{sinc}(N(\phi_{T2}-\theta_T(l^*)))\operatorname{sinc}(N(\theta_R(l^*)-\phi_{R2}))$$
$$P(\phi_{T2},\phi_{R2}) = \angle\alpha(l^*) + \frac{(N-1)(\phi_{T2}-\theta_T(l^*)+\theta_R(l^*)-\phi_{R2})}{2}$$

The relative gain change is $$\frac{G(\phi_{T1},\phi_{R1})}{G(\phi_{T2},\phi_{R2})} = \frac{\operatorname{sinc}(N(\phi_{T1}-\theta_T(l^*)))\operatorname{sinc}(N(\theta_R(l^*)-\phi_{R1}))}{\operatorname{sinc}(N(\phi_{T2}-\theta_T(l^*)))\operatorname{sinc}(N(\theta_R(l^*)-\phi_{R2}))}$$

and the relative phase change is $$P(\phi_{T1},\phi_{R1}) - P(\phi_{T2},\phi_{R2}) = \frac{(N-1)(\phi_{T1}-\phi_{T2}+\phi_{R2}-\phi_{R1})}{2}$$

Assuming that the second beam-combination $(\phi_{T2}, \phi_{R2})$ is refined for the micro-route 1* which is equivalent to $\phi_{T2} \approx \theta_T(1^*)$ and $\phi_{R2} \approx \theta_R(1^*)$, we have $$\frac{G(\phi_{T1},\phi_{R1})}{G(\phi_{T2},\phi_{R2})} \approx \operatorname{sinc}(N(\phi_{T1}-\phi_{T2}))\operatorname{sinc}(N(\phi_{R2}-\phi_{R1}))$$

Now consider the effect of ground bounce. Since the Azimuth beam pattern is common for both LOS and ground bounce paths, we have $$h(\tau) \approx \left(\exp\left(\frac{(N-1)(\Delta_T+\Delta_R)}{2}\right)\operatorname{sinc}(N\Delta_T)\operatorname{sinc}(N\Delta_R)\right)$$
$$(\alpha^{LOS}\delta(\tau-\tau^{LOS}) + \alpha^{GB}\delta(\tau-\tau^{GB}))$$

where $\alpha^{LOS}$ and $\tau^{LOS}$ are the complex coefficient and relative path delay for the LOS path respectively, $\alpha^{GB}$ and $\tau^{GB}$ are the complex coefficient and relative path delay for the ground bounce respectively.

It can be seen from the above that the above channel response can be considered to have two components; one based on the beamforming relative to the AoA and AoD while the other is purely based on the physical propagation path. It can be verified that the relative gain change and the phase change is the same regardless of the presence or absence of the ground bounce. Based on the analysis above, at least some embodiments include the following methods for mapping the beamformers into the clusters.

Clustering Based on Array Beam-Width (Passive Method)

It can be observed in FIG. 2A that the antenna pattern response is reduced by 5 dB in less than 2.5 degrees from the peak (5 dB beam-width=5 deg). As a result, two working beam combinations ($\phi_{T1}$, $\phi_{R1}$) and ($\phi_{T2}$, $\phi_{R2}$) are independent (different clusters) if $$|f(\phi_{T1}) - f(\phi_{T2})| > \frac{5\pi}{180} \text{ and } |f(\phi_{R1}) - f(\phi_{R2})| > \frac{5\pi}{180}$$

where f(x) maps the DFT angular frequency into physical angle of arrival/departure.

$$f(x) = \cos^{-1}\left(\frac{\lambda x}{2\pi d}\right)$$

This method is passive as it doesn't require any OTA (over the air) communication to determine correlation.

Clustering Based on Mismatched Combination (Active Method)

This is an active method wherein OTA communication is required to detect correlation. Two combinations are correlated if this is true:

$$\Gamma(\phi_{T1}, \phi_{R2})=1 \text{ and } \Gamma(\phi_{T2}, \phi_{R1})=1$$

Where $\Gamma(.)$ is an indicator function for the success of the beam combination in establishing the link.

Also, the following is a good measure of correlation:

$$G(\phi_{T2}, \phi_{R2}) \leq \max(G(\phi_{T2}, \phi_{R1}), G(\phi_{T1}, \phi_{R2}))$$

Based on Relative Gain and Phase Change (Active Method)

This method can use BRP (beam refinement protocol) fields for efficient testing of the hypothesis OTA. Using BRP fields, the following metrics are calculated:

Based on the analysis in this section, the relative gain change should be such that $$\min\left(\frac{G(\phi_{T1}, \phi_{R1})}{G(\phi_{T2}, \phi_{R2})}, \frac{G(\phi_{T2}, \phi_{R2})}{G(\phi_{T1}, \phi_{R1})}\right) \approx \text{sinc}(N(\phi_{T1} - \phi_{T2}))\text{sinc}(N(\phi_{R2} - \phi_{R1}))$$

and the relative phase change should be $$P(\phi_{T1}, \phi_{R1}) - P(\phi_{T2}, \phi_{R2}) = \frac{(N-1)(\phi_{T1} - \phi_{T2} + \phi_{R2} - \phi_{R1})}{2}$$

In general, the above-calculations can also be computed without using BRP, but rather, using channel estimation and path delay estimation.

Otherwise the beam-combination is not correlated.

At least some embodiments include a packet structure such that training fields of the packets are employed to check for correlation of beams.

FIG. 3 shows a table of measured qualities of micro-routes, according to an embodiment. The table includes the measured value of the link quality between the transmitting node (either the first node or the second node) and the receiving node (either the first node or the second node). For an embodiment, the columns (1-12) of the table represent different beam directions (AoD) of the first (transmitting) node. For an embodiment, the rows (1-12) of the table represent different beam directions (AoA) of the second (receiving) node.

As stated above, for an embodiment, a link quality characterization is made at each of the beam forming directions of the transmitting and the receiving nodes. For the table of FIG. 3, the value of "X" indicates the link quality is below a predetermined threshold. That is, the link quality at these settings of the beam directions of the first and second nodes is below a threshold.

For an embodiment, one or more of the "V"s depicted in FIG. 3 represent a cluster of measurements as shown in FIG. 2B. That is, the "V" may represent multiple measurements that have been clustered into a single representation. That is, each of the beam settings depicted in FIG. 3 may include finer resolution settings that have been clustered into the single representation.

A first link quality measurement is depicted as "V1" which correspond to a beam direction setting of the first node of 6, and a beam direction setting of the second node of 6. If the value of V1 is greater than all the other measured values of the link quality, then these settings correspond with the highest quality micro-route between the first node and the second node. For an embodiment, this micro-route may be selected for communication between the first node and the second node. However, at least some embodiments include identifying other micro-routes that may be used if the originally selected micro-route fails.

As shown by the table of FIG. 3, other values V2 (which corresponds with the beam direction setting of 4 of the first node and the beam direction setting of 6 of the second node), V3 (which corresponds with the beam direction setting of 8 of the first node and the beam direction setting of 6 of the second node), V4 (which corresponds with the beam direction setting of 6 of the first node and the beam direction setting of 4 of the second node), V5 (which corresponds with the beam direction setting of 6 of the first node and the beam direction setting of 8 of the second node), V6 (which corresponds with the beam direction setting of 1 of the first node and the beam direction setting of 4 of the second node), V7 (which corresponds with the beam direction setting of 2 of the first node and the beam direction setting of 2 of the second node), V8 (which corresponds with the beam direction setting of 4 of the first node and the beam direction setting of 2 of the second node), V9 (which corresponds with the beam direction setting of 6 of the first node and the beam direction setting of 2 of the second node), V10 (which corresponds with the beam direction setting of 10 of the first node and the beam direction setting of 11 of the second node), V11 (which corresponds with the beam direction setting of 3 of the first node and the beam direction setting of 11 of the second node), V12 (which corresponds with the beam direction setting of 3 of the first node and the beam direction setting of 10 of the second node), V13 (which corresponds with the beam direction setting of 4 of the first node and the beam direction setting of 11 of the second node), are also depicted. Anyone of these other measured values of link quality may be different micro-route than the micro-route corresponding with the measure link quality of V1.

Once the table of measured values of link quality for each of the plurality of beam forming directions of the transmitting node and the receiving node has been determined, the next act is to determine which of these measure values of link quality correspond with different micro-routes. That is, some of these measure values could correspond with a different micro-route, or some of the measured values could correspond with a side-lobe of a common micro-route. It is desirable to determine which of the measure value correspond with micro-routes and which correspond with side-lobes because different side-lobes of a main lobe of a micro-route are highly correlated with the main lobe. Accordingly, if the main lobe falters (reduced signal quality causing a sensed condition) or is no long available, then the side-lobes of that micro-route will typically not be available either. As previously described, at least some embodiments include identifying an alternate micro-route that can be used if a selected micro-route no longer performs as well as desired or fails.

One way to determine whether a measured value of signal quality corresponds with another micro-route or as a side lobe of a micro-route is to determined where the side lobes should be located in, for example, the table of FIG. 3. The following discussion directed to lobes and expected amplitude (measured) of side lobes can be used by at least some embodiments to distinguish between side lobe of a main lobe, and alternate (different) micro-routes.

Figure 4:
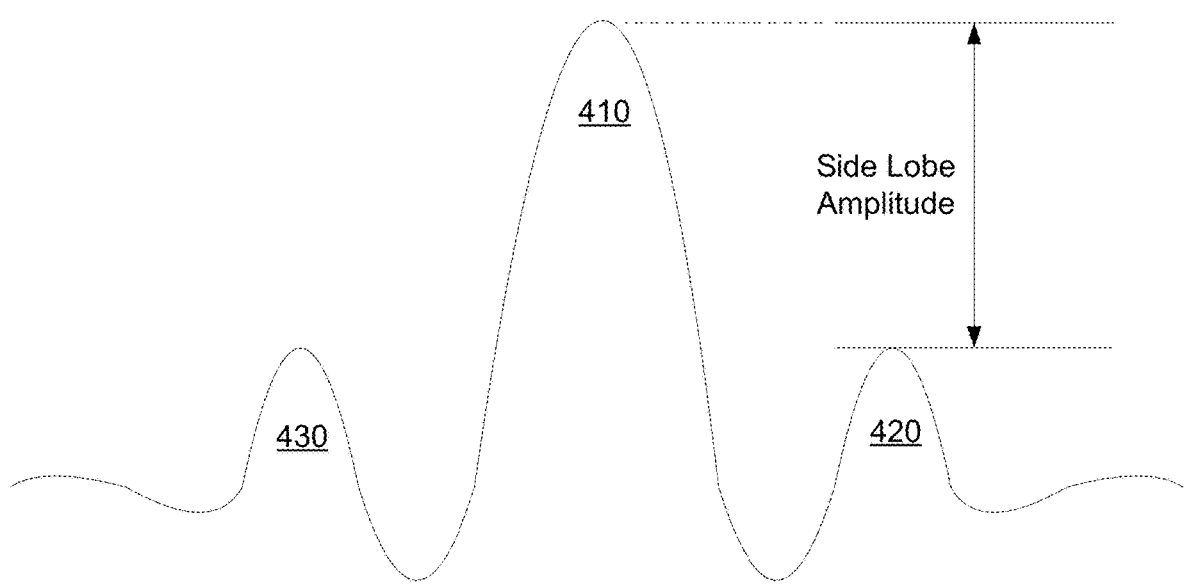
FIG. 4 shows a primary lobe and side lobes of a beam-formed signal, according to an embodiment.

FIG. 4 shows a primary lobe 410 and side lobes 420, 430 of a beam-formed signal, according to an embodiment. As will be described, expected measured values of the side lobes (such as shown in FIG. 4) of the primary lobe of the beam formed transmitted signal can be used to distinguish between different micro-routes and side lobes of the table of FIG. 3. That is, typically a side-lobe of a primary lobe has an amplitude having a power level that is less than the amplitude of the power level of the primary lobe by an expected value. If the observed value of the amplitude is greater than the expected value, then it can be concluded that a potentially observed side lobe is actually a different micro-route not a side lobe.

FIG. 5 shows a table of measured qualities of micro-routes, and further shows measured qualities that could represent a primary lobe and side lobes of a beam-formed signal, according to an embodiment. The side lobes of the beam setting direction 6 of the first (transmitting) node will tend to fall within the same column. That is, the side lobes of the micro-route corresponding to the measure link quality of V1 will tend to be located within the same column of the table as the measured value of V1. For example, the measured link qualities of V4 and V5 may be initially categorized as corresponding with side lobes because they are located in the same column as the micro-route of V1.

Further, the side lobes of the beam setting direction 6 of the first (transmitting) node will tend to fall within the same column. That is, the side lobes of the micro-route corresponding to the measure link quality of V1 will tend to be located within the same row of the table as the measured value of V1. For example, the measured link qualities of V2 and V3 may be initially categorized as corresponding with side lobes because they are located in the same row as the micro-route of V1.

Further, for an embodiment, the measured values of V6, V7, V8, V9, V10, V11, V12, V13 are categorized as corresponding with different micro-routes than the micro-route of V1 because these value are all located within the table of FIG. 5 and FIG. 3 at different columns and rows as the V1. Note, however, that some of these values maybe side lobes of the others of these values.

Figure 6:
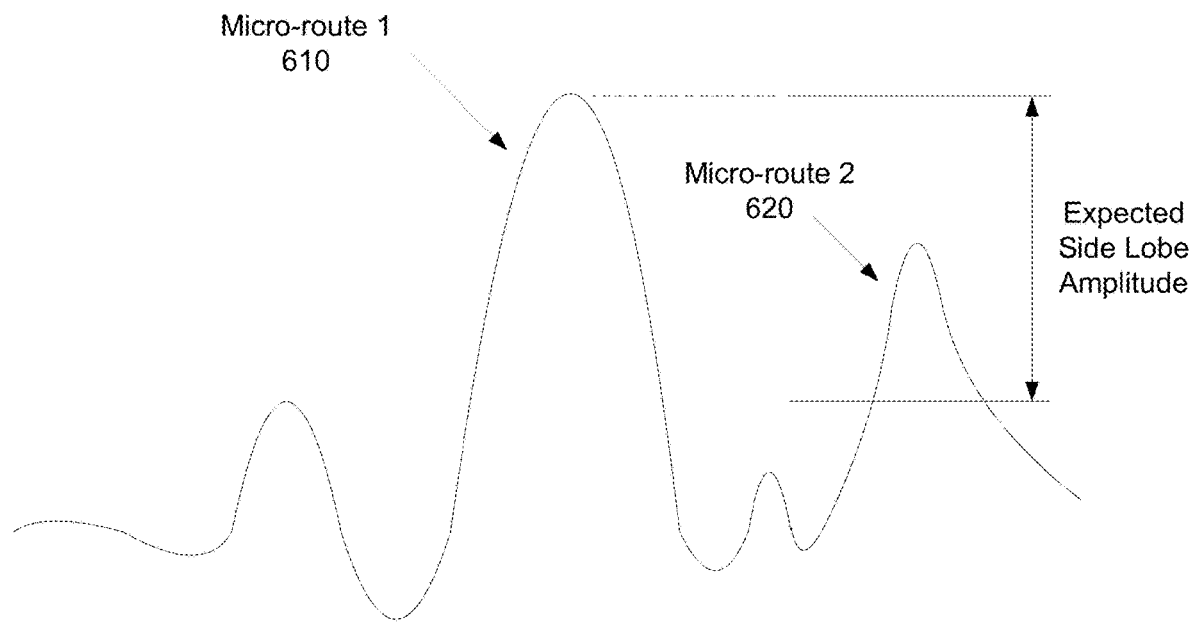
FIG. 6 shows a primary lobe and side lobes of a beam-formed signal, and further shows a possible signal of a separate micro-route, according to an embodiment.

FIG. 6 shows a primary lobe and side lobes of a beam-formed signal, and further shows a possible signal of a separate micro-route, according to an embodiment. As shown, the micro-route 620 could be confused as a side lobe of the micro-route 610. However, the amplitude of the micro-route 620 is too large to be considered a side lobe. That is, a side lobe of the micro-route 610 would be expected to have an amplitude (measured signal quality) that is lower than the amplitude of the micro-route 610 by the expected side lobe amplitude threshold. However, the amplitude of the micro-route 620 is greater than this amount, and accordingly, can be designated as a separate micro-route.

FIG. 7 shows a first table that lists a measured link quality for each of five micro-routes, and lists a level of correlation with a first micro-route take at a time T1, a second table that lists a measured link quality for each of the five micro-routes, and lists a level of correlation with a first micro-route take at a time T2, according to an embodiment. As previously described, as the conditions of the wireless network changes, the level of correlation between micro-routes can change. For at least some embodiments, the level of correlation between the different identified micro-routes is monitored (measured) over time. Further, conditions can be sensed to determine whether to re-measure the level of correlation between micro-routes.

For an embodiment, determining the level of correlation between a first micro-route and a second micro-route includes determining how much as event or sensed condition effects both of the first micro-route and the second route. The more correlated the first micro-route is to the second micro-route, the more similar the effect the event or the sensed condition has on both of the first micro-route and the second micro-route. Further, the less correlated the first micro-route is to the second micro-route, the less the effect the event or the sensed condition has on both of the first micro-route and the second micro-route.

As previously described, for at least some embodiments, if a link condition (for example, a failure of the link) of a micro-route being used for wireless communication is sensed or determined, a new micro-route is selected based on the level of correlation of the new micro-route with the micro-route being used. For an embodiment, the less correlated the new micro-route is with the micro-route being used, the more likely the chances are that the new micro-route will be selected if the link condition (for example, a failure of the link) of a micro-route being used for wireless communication is sensed or determined.

As previously described, for at least some embodiments, the micro-routes between the transmitting node and the receiving node are monitored over time. That is, the performance of the micro-routes is re-characterized repeatedly over time. For at least some embodiments, the level of correlation between the different micro-routes is determined by determining variations in the performance (for example, measured link quality) between the different micro-routes over the repeated characterizations. That is, the correlation determination includes determining whether the performance of the different micro-routes changes similarly or differently over time. The more correlated different micro-routes are, the more similar the variations in the performance of the micro-routes. The less correlated the different micro-routes are, the less similar the variation in the performance of the micro-routes. Statistical processes can be used to determine the similarity or difference between different micro-routes over time by comparing the performance of the different micro-route over the repeated characterization of the performance of the different micro-routes over time.

As previously described, for at least some embodiments, the correlation between different micro-routes is determined by determining how the performance of the different micro-routes is affected by a change in a network condition. Exemplary network conditions include the introduction or the elimination of one or more interfering signals, a change in network topology (such as, the addition or removal of a network node, or the change of location of a network node), a change in the environment around or surrounding the wireless network (such as, movement of, addition of, or subtraction of a physical object). If the different micro-routes are correlated, then the change in the network condition will change the performance of the different micro-routes similarly. If the different micro-routes are not correlated, then the change in the network condition will change the performance of the different micro-routes differently. Statistical processes can be used to determine the similarity or difference between different micro-routes with changes in the network conditions.

For an embodiment a matrix is generated wherein the elements of the matrix indicate the correlation between a micro-route represented by row Ii with micro-route represented by column j.

For an embodiment, the correlation between a first micro-route and a second micro-route is determined based on the angular difference between the AoD at the transmitter for the first micro-route and for the second micro-route, and/or the angular difference between the AoA at the receiver for the first micro-route and for the second micro-route. That is, the correlation between the first micro-route and the second micro-route is determined as a function of the difference between the AoD at the transmitter for the first micro-route and the AoD at the transmitter for the second micro-route, and/or as a function of the difference between the AoD at the transmitter for the first micro-route and the AoD at the transmitter for the second micro-route Correlated Micro-Routes and Back Up Micro-Routes For at least some embodiments, two micro-routes are considered correlated if:

$$Pr(uR[k]=1|uR[i]=0) \leq \rho Pr(uR[k]=1)$$

where $\rho$ is the correlation detection threshold. An exemplary $\rho$ is: $\rho=0.7$.

A useful metric to determine a back-up micro-route $$k^* = \arg\max Pr(uR[k]=1|uR[i]=0).$$

For an embodiment, a set of top independent micro-routes for micro-route i is given as $$S_i = \{k_1 \ldots k_N\}$$

such that $$Pr(uR[k_1]=1|uR[i]=0) \geq Pr(uR[k_2]=1|uR[i]=0) \ldots \geq Pr(uR[k_N]=1|uR[i]=0)$$

and $$Pr(uR[k_N]=1|uR[i]=0) \geq Pr((uR[j]=1|uR[i]=0)) \forall j \notin S_i.$$

When a set of micro-routes is communicated to the link, the link has more flexibility in determining the best back-up from the set based on the recent channel conditions:

Another metric to determine a back-up micro-routes is solely based on the marginal distribution:

$$k^* = \arg\max Pr(uR[k]=1)$$

For at least some embodiments, the transmitter of the link communicates the list of back-up micro-routes to its receiver. Further instead of solely relying on the E2E (end-to-end) statistics at, for example, a central controller, the backup micro-route can be determined based on a weighted combination of one or more of E2E computation of conditional probability, the current capacity of the micro-route (at the link level), an angular distance to the existing micro-route (the farther the better). Note that each of the metrics individually is one of the special cases of the weighted metric.

Time Correlation

For at least some embodiments, another important statistical analysis is the correlation of micro-route across time. This analysis can deduce some of the following ON-OFF behavior of micro-routes. First, distribution nodes near, for example, a traffic intersection undergo a periodic pattern in which a few micro-routes are blocked or created during a finite time window. For example, at an intersection depending on the lights, the traffic can go parallel/perpendicular to the direction of the link. Second, bus parking during night.

To compute the probabilities, at least some embodiments include filtering observations based on the time mask. Based on the initial observations, a controller can trigger time-specific procedures to confirm or reject the hypothesis. For example, when the computed correlation is close to the threshold, the controller can trigger a link level procedure using BRP fields to compute relative magnitude and phase.

Figure 8:
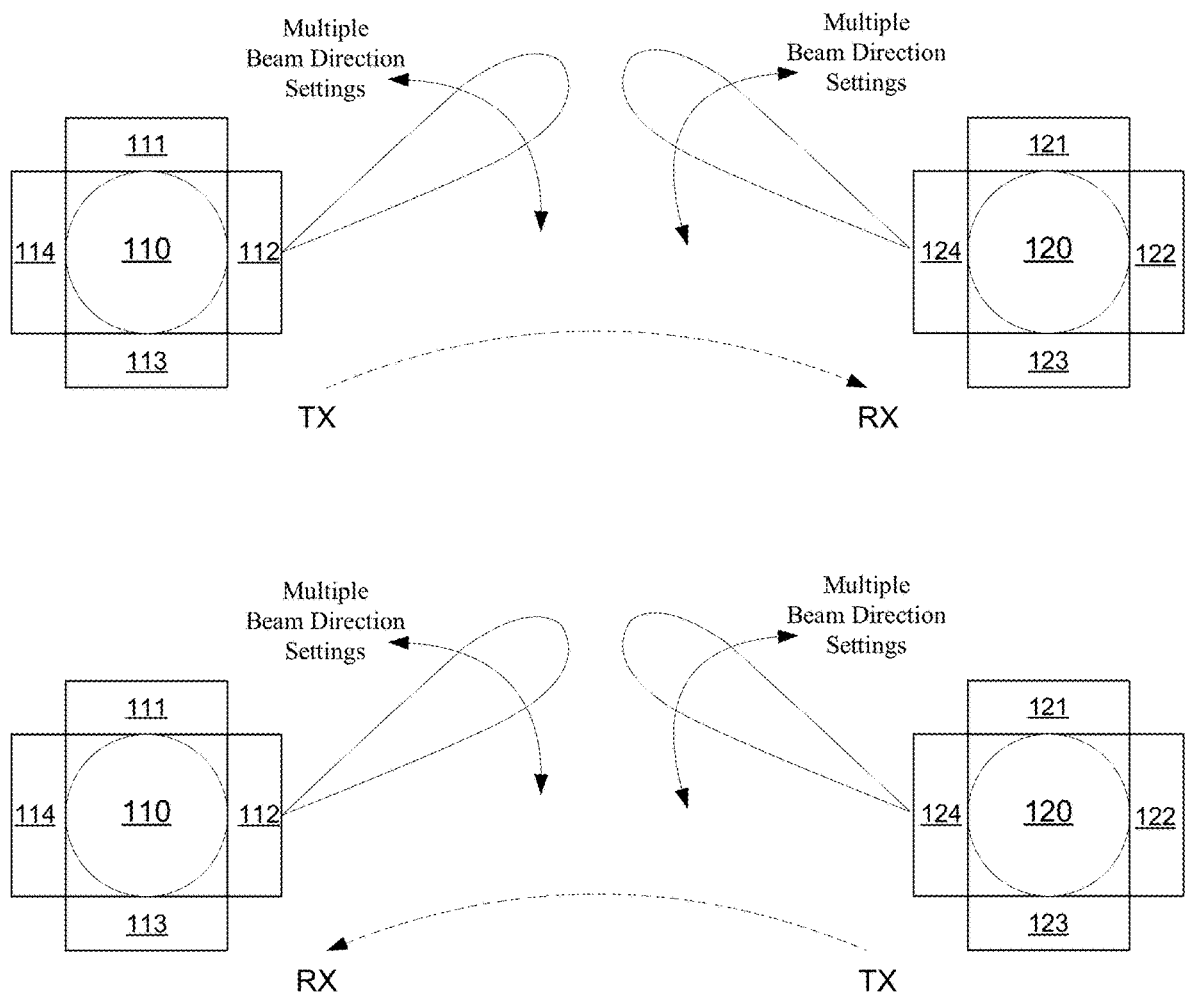
FIG. 8 shows a first node and a second node of a wireless network, wherein micro-routes between the first node and the second node are characterized in two transmit and receive directions, according to an embodiment.

FIG. 8 shows a first node and a second node of a wireless network, wherein micro-routes between the first node and the second node are characterized in two transmit and receive directions, according to an embodiment. That is, FIG. 1B describes characterizing the micro-links while the node 110 is transmitting and the node 120 is receiving. However, as shown in FIG. 8, the relationship between the nodes 110, 120 can be reversed during the characterization process.

For an embodiment, a matrix or table of measured qualities of micro-routes similar to the table of FIG. 3 is generated in both transmit and receive direction, resulting in more than one matrix or table. That is, for example, a matrix or table of measured qualities of micro-routes is generated when the node 110 is transmitting and the node 120 is receiving, and another matrix or table of measured qualities of the micro-routes is generated when the node 110 is receiving and the node 120 is transmitting. For an embodiment, the one or more matrices of the qualities of the micro-routes are combined.

For an embodiment, combining the matrices that are generated in the two different link directions include identifying clusters that are common to both of the matrices, and only including the common clusters within the combined matrix. That is, clusters of one matrix that are not also within the other matrix are eliminated from the combined matrix.

Figure 9:
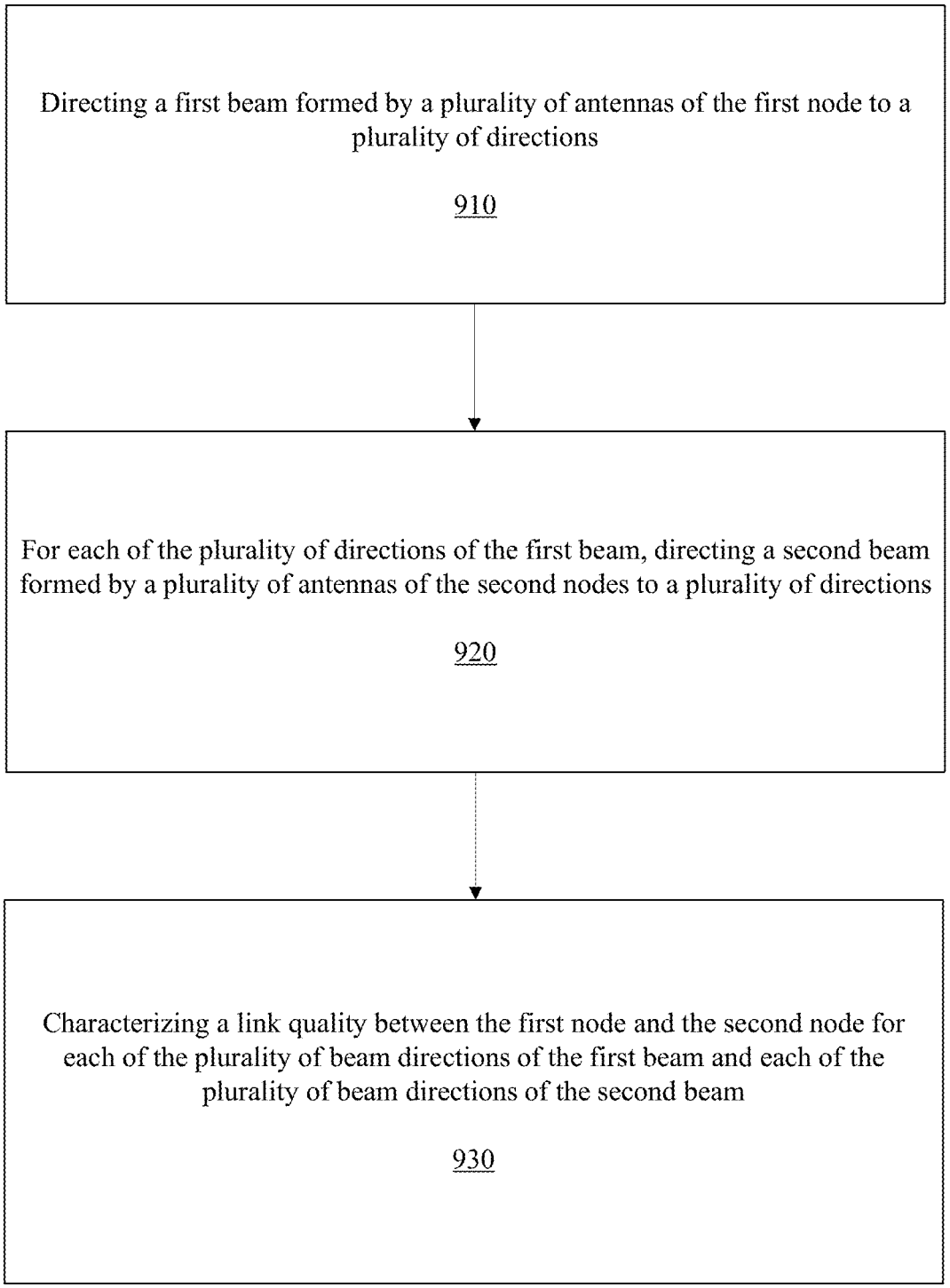
FIG. 9 is a flow chart that includes acts of a method of characterizing micro-links between a first node and a second node, according to an embodiment.

FIG. 9 is a flow chart that includes acts of a method of characterizing micro-links between a first node and a second node, according to an embodiment. A first step 910 includes directing a first beam formed by a plurality of antennas of the first node to a plurality of directions. A second step 920 includes directing a second beam formed by a plurality of antennas of the second nodes to a plurality of directions for each of the plurality of directions of the first beam. A third step 930 includes characterizing a link quality between the first node and the second node for each of the plurality of beam directions of the first beam and each of the plurality of beam directions of the second beam.

For at least some embodiments, characterizing the link quality includes determining whether the link quality is better than a threshold. For at least some embodiment, a known signal (that is, characteristics of the signal, such as, the transmit signal power level) is transmitted from one of the first node or the second node, and received at the other of the first or second node. For an embodiment, the received signal strength of the received signal indicates the link quality of the micro-route. For an embodiment, only link qualities better than a threshold are recorded and utilized.

At least some embodiments further include forming a matrix that includes the characterized link quality for each of the each of the plurality of beam directions of the first beam and each of the plurality of beam directions of the second beam. For an embodiment, the matrix includes entries that represent 2 dimensions of space as defined by the directions of the first beam and the directions of the second beam. Further, for an embodiment, the matrix includes entries that represent 3 dimensions of space.

At least some embodiments further include identifying one or more clusters of characterized link qualities that include characterized link qualities greater than a threshold.

At least some embodiments further include classifying the one or more clusters. As previously described, for at least some embodiments the one or more clusters are classified as at least one of side lobes or micro-routes.

At least some embodiments further include determining a level of correlation between each of the micro-routes.

At least some embodiments further include monitoring link conditions between the first node and the second node, and re-characterizing at least a subset of the one or more micro-routes between a first node and a second node if the monitored link conditions are determined to change by more than a threshold. For an embodiment, detected changes in signal qualities of signals communicated between the first node and the second node are used for determining when to re-characterize the micro-routes between the first node and the second node.

Figure 10:
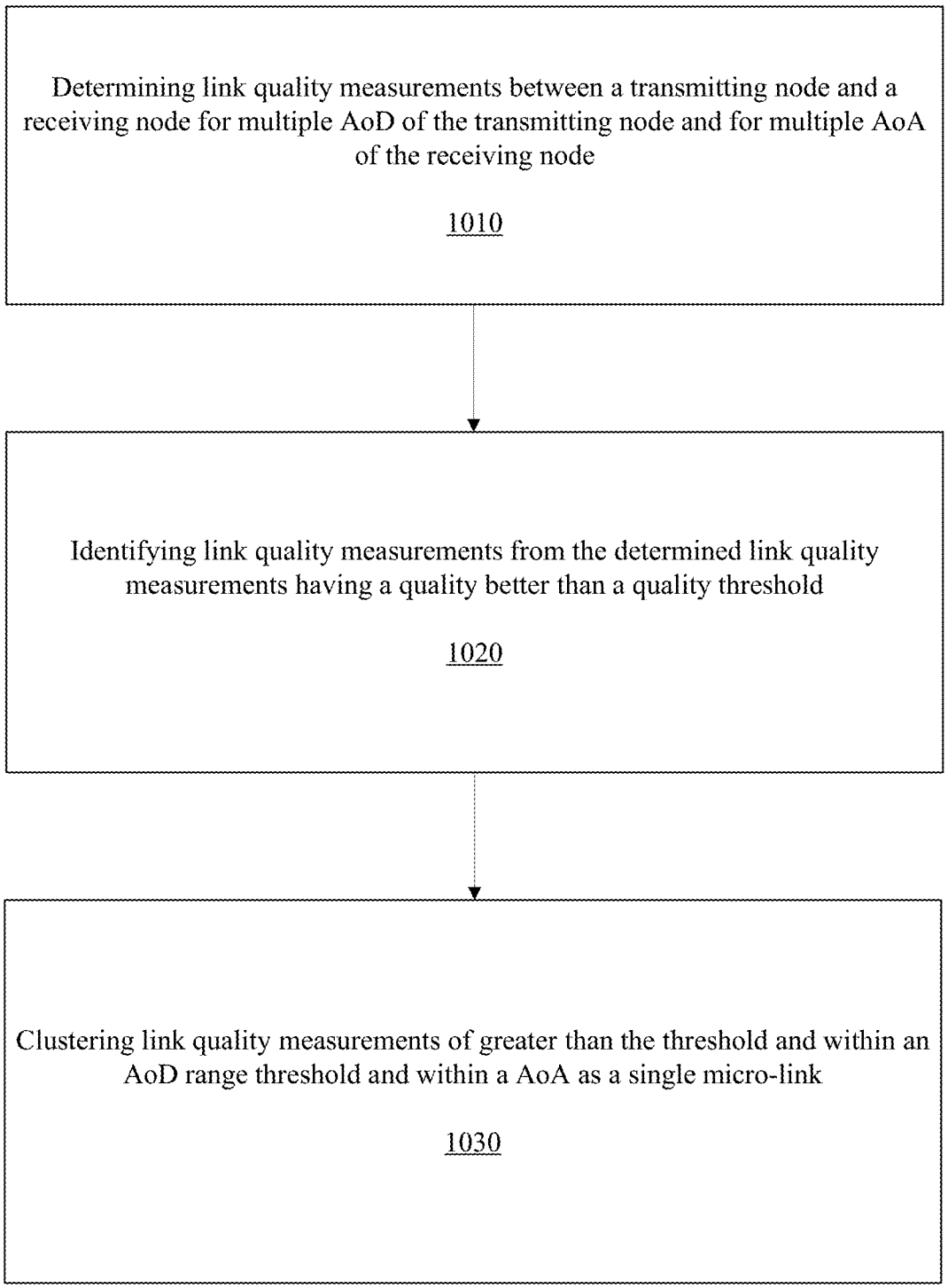
FIG. 10 is a flow chart that includes acts of a method of clustering measured signal qualities of micro-routes, according to an embodiment.

FIG. 10 is a flow chart that includes acts of a method of clustering measured signal qualities of micro-routes, according to an embodiment. A first step 1010 determining link quality measurements between a transmitting node and a receiving node for multiple AoD of the transmitting node and for multiple AoA of the receiving node. A second step 1020 includes identifying link quality measurements from the determined link quality measurements having a quality better than a quality threshold. A third step 1030 includes clustering link quality measurements of greater than the threshold and within an AoD range threshold and within a AoA as a single micro-link. That is, as shown in FIG. 2A, a single micro-route may be formed between the transmitting node and the receiving nodes for a small (threshold) range of variations of the AoD and AoA. For an embodiment, the measured link qualities for small (less than a threshold) of variations of AoD and AoA having a link quality better than the quality threshold are clustered, and designated as a single micro-route. Once clustered, the described embodiment further includes classifying the different identified clusters as a side-lobes if each other or as separate micro-links.

Figure 11:
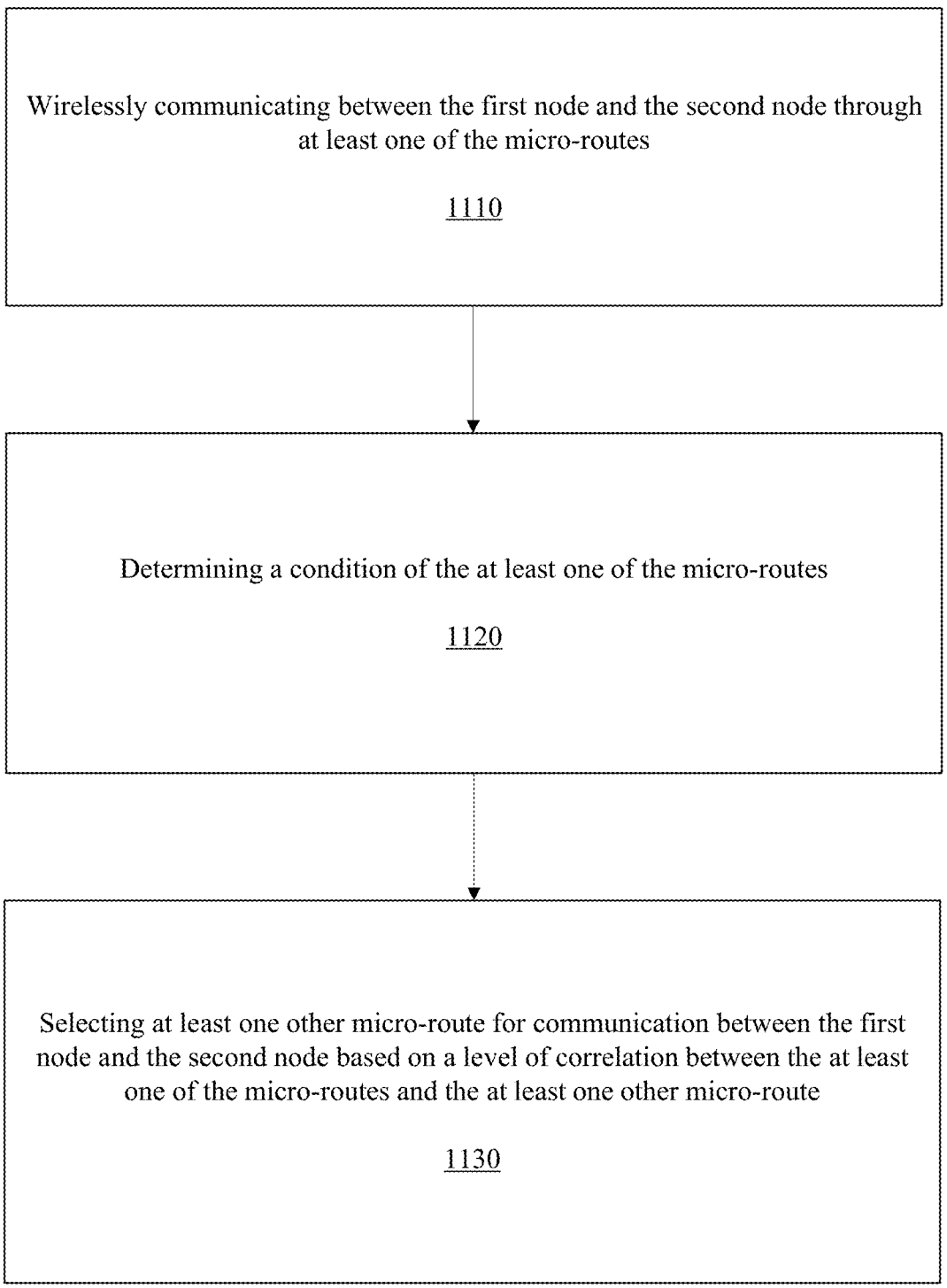
FIG. 11 is a flow chart that includes acts of a method selecting micro-links for communication between a first node and a second node of a wireless network, according to an embodiment.

FIG. 11 is a flow chart that includes acts of a method selecting micro-links for communication between a first node and a second node of a wireless network, according to an embodiment. A first step 1110 includes wirelessly communicating between a first node and a second node through a wireless link formed by at least one micro-route. A second step 1120 includes determining a condition of the at least one micro-route. For an embodiment, the condition of the at least one micro-route includes a quality of the micro-route. For an embodiment, determining the condition includes transmitting a signal through the micro-link and determining a received signal quality or a receive signal amplitude at the receiving node. For an embodiment, if the quality or amplitude of the receive signal is below a threshold, then the micro-route condition is determined to be a link failure, and a new or different micro-route is selected because of the detected failure of the at least one micro-route. For at least some embodiments, the signal quality includes a measurement of at least one of SNR (signal to noise ratio), PER (packet error rate), or BER (bit error rate) of signals communicated from the transmitting node to the receiving node through the micro-route.

A third step 1130 includes selecting at least one other micro-route for communication between the first node and the second node based on a level of correlation between the at least one micro-route and the at least one other micro-route. As previously described, the correlation between different micro-routes can be monitored over time. For at least some embodiments, the correlations between different micro-routes is stored, and retrieved when a new micro-route is to be selected due to the failure (sensed condition) of a micro-route being used to communication information between the transmitting node and the receiving node.

For at least some embodiment, the at least one micro-route and the at least one other micro-route are selected from a plurality of predetermined micro-routes. For an embodiment, the predetermine micro-routes are determined by characterizing one or more micro-routes between a first node and a second node. For example, for an embodiment, the one or more micro-routes between the first node and the second node are determined through a characterization process, and stored in memory. The at least one micro-route is accessed from memory and used for wirelessly communicating between the first node and the second node. Upon detecting a condition, such as, failure of the at least one micro-route, the at least one other micro-route is retrieved from memory, and selected for wireless communication between the first node and the second node based on the level of correlation (typically, the least correlated, or correlated less than a threshold or desired amount) between the at least one micro-route and the at least one other micro-route.

As previously described, for an embodiment, characterizing one or more micro-routes between a first node and a second node includes directing a first beam formed by a plurality of antennas of the first node to a plurality of directions, directing a second beam formed by a plurality of antennas of the second nodes to a plurality of directions for each of the plurality of directions of the first beam, and characterizing a link quality between the first node and the second node for each of the plurality of beam directions of the first beam and each of the plurality of beam directions of the second beam. For at least some embodiment, the characterized one or more micro-routes are stored in the memory.

Pattern Detection

Figure 12:
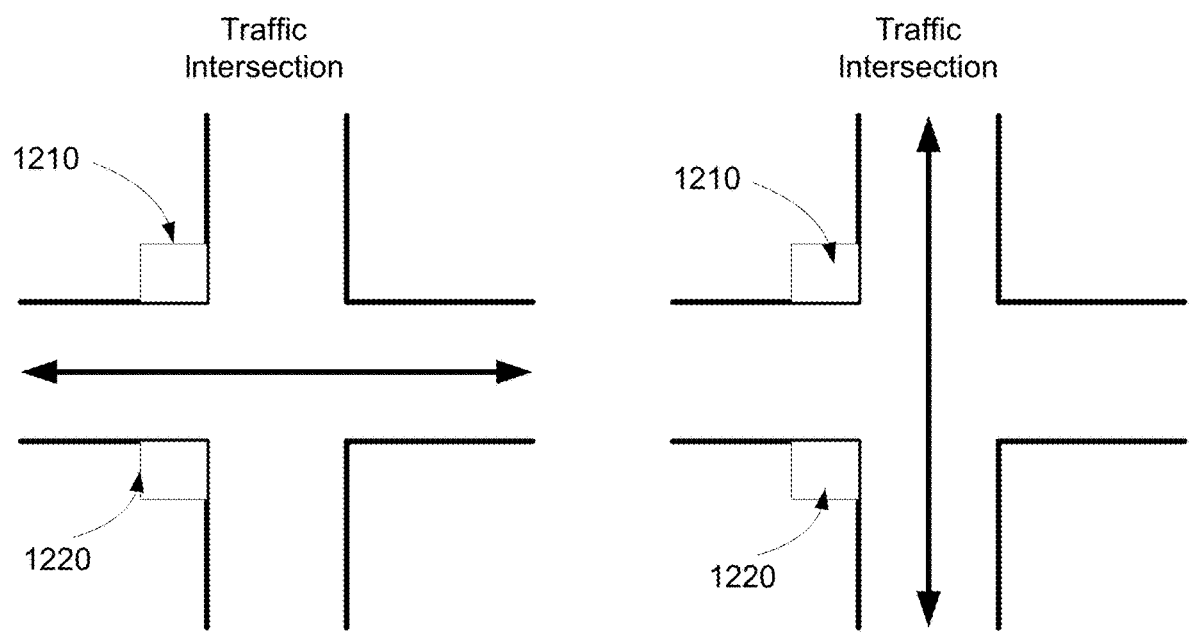
FIG. 12 shows a transmitting node and a receiving node located proximate to a traffic intersection, and implementation of pattern detection that is used for micro-route characterization and selection, according to an embodiment.

FIG. 12 shows a transmitting node 1210 and a receiving node 1220 located proximate to a traffic intersection, and implementation of pattern detection that is used for micro-route characterization and selection, according to an embodiment. For an embodiment, the nodes 1210, 1220 are connected through one or more networks to an upstream cloud server. Accordingly, the cloud server performs or has access to the characterization and selection of micro-routes between the nodes 1210, 1220. For an embodiment, collected information relating to the characterization and selection of micro-routes is used for determining patterns in operations and changes in the environmental around the nodes 1210, 1220. For example, a bus creating/blocking some micro-routes during a particular time window can be mined out of data of the collected information. Further, from the micro-route reports it is possible to classify whether a link (of the micro-routes) lies at a busy road with frequent environmental changes or in a quite street. Based on the classification, different parameters for link adaptation can be selected. For example, based on the periodic micro-route training, it can be deduced whether the link is undergoing more frequent fading/pole sway/foliage sway/blockage. Based on the classification, conservative or aggressive parameters can be set. Further, the micro-route training can be adaptive based upon sensed conditions of the wireless network.

Cloud Server and Node Controller

Figure 13:
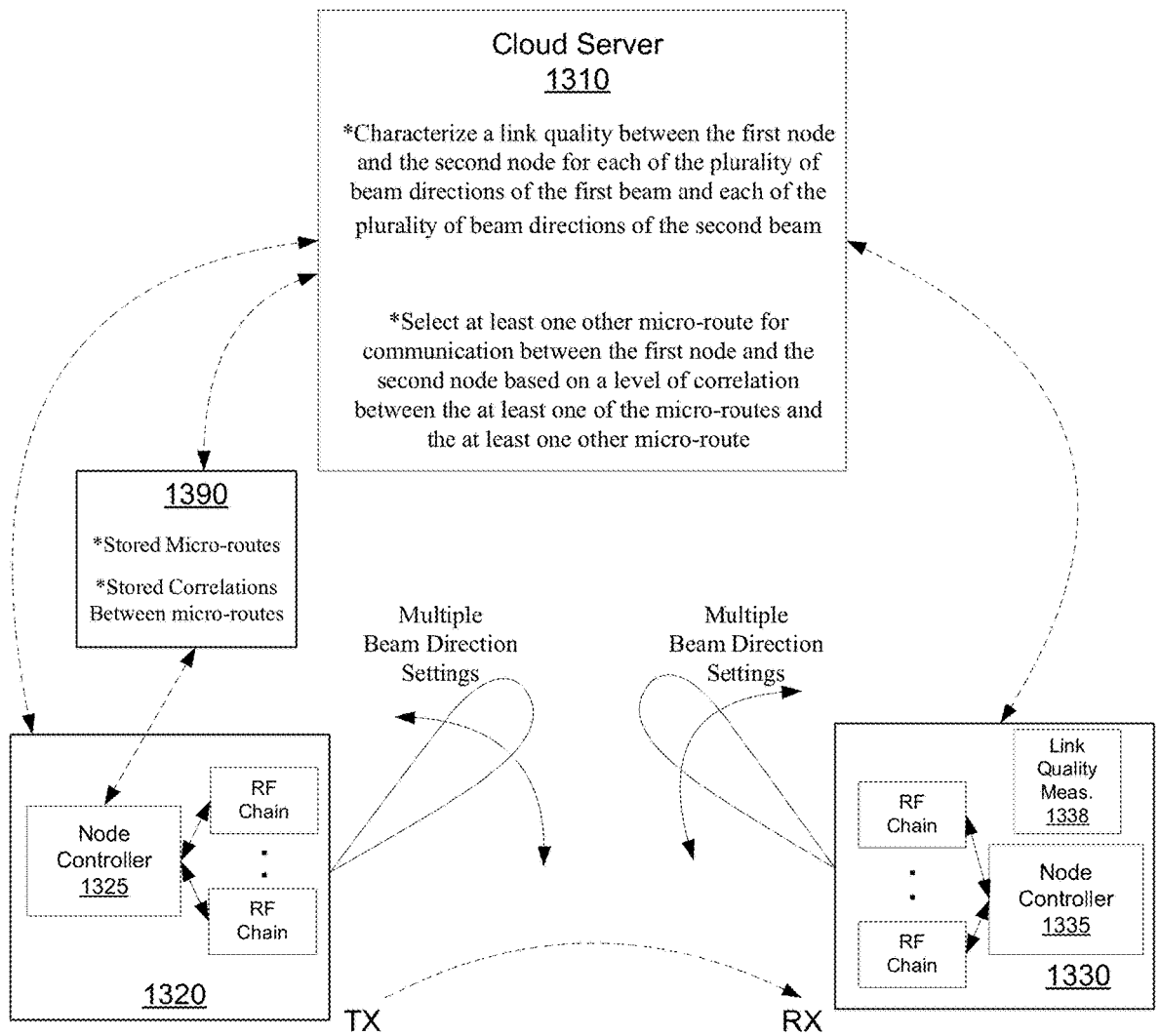
FIG. 13 shows a transmitting node, a receiving node, and a cloud server, according to an embodiment.

FIG. 13 shows a transmitting node 1320, a receiving node 1330, and a cloud server 1310, according to an embodiment. As shown, the transmitting node 1320, and the receiving node 1330 are connected to the cloud server 1310. This connection can be through one or more networks that provide a communication path between the cloud server 1310 and the nodes 1320, 1330.

As previously described, the cloud server 1310 can be connected to many different nodes of the wireless network, and can collect information related to the nodes of the wireless network. For an embodiment, the cloud server 1310 performs at least one of the determination of conditions of one or more one micro-routes between the nodes, or selection one or more different micro-routes for communication between the first node and the second node based on a level of correlation between the one or more micro-routes and the one or more different micro-routes. For an embodiment, the cloud server 1310 performs the characterization of one or more micro-routes between a first node and a second node.

For at least some embodiments, the cloud server 1310 further performs at least one of the clustering of the measured link qualities into micro-routes, classifying the micro-routes, and determining a level of correlation between the identified micro-routes.

The transmitting node 1320 includes multiple RF (radio frequency) chains which are connected to multiple antennas of the transmitting node 1320. As previously described, the multiple antennas generate a directional beam which is directionally controlled, for example, by controlling the amplitude and phase of the signals transmitted by the multiple antennas.

For at least some embodiments, a node controller 1325 of the transmitting node and/or the cloud server 1310 aid in the characterization and determination of micro-route available for wireless communication between the transmitting node 1320 and the receiving node 1330. Once the micro-routes have been characterized and determined, the micro-routes may be stored in memory 1390.

Further, the node controller 1325 of the transmitting node and/or the cloud server 1310 aid in determination of the correlation between the micro-route available for wireless communication between the transmitting node 1320 and the receiving node 1330. Once the correlations between the micro-routes have been determined, the correlations may be stored in memory 1390.

The node controller 1325 of the transmitting node 1320 can access the stored micro-routes from the memory 1390 when determining which micro-routes to utilize for wirelessly communicating with the receiving node 1330. Further, the node controller 1325 of the transmitting node 1320 can access the stored correlations between the micro-routes from the memory 1390 when determining which micro-routes to select upon determining that the present micro-route being used satisfies a condition (such as, a failure in performance).

The receiving node 1330 also includes multiple RF chains for the multiple antennas of the receiving node 1330. For an embodiment, the receiving node 1330 performs link quality measurements 1338 during the determination and characterization of the micro-links between the transmitting node 1320 and the receiving node 1330. For an embodiment, after the receiving node 1130 performs link quality measurements 1338, the link quality measurements 1338 are stored in the memory 1390 for future access. Further, for at least some embodiments, the correlation determinations between the characterized micro-links are stored in the memory 1390 as well.

Embodiments according to the invention are in particular disclosed in the attached claims directed to a method and a system, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof is disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

In an embodiment according to the invention, a method may comprise wirelessly communicating between a first node and a second node through a wireless link formed by at least one micro-route, determining a condition of the at least one micro-route, and selecting at least one other micro-route for communication between the first node and the second node based on a level of correlation between the at least one micro-route and the at least one other micro-route after determining the condition.

A node may especially be any kind of connection point, redistribution point or communication endpoint, as for example a data communication equipment (e.g. modem, hub, bridge, switch) or a data terminal equipment (e.g. digital telephone handset, printer, host computer, router, workstation or server). In particular a node may be a wireless router and/or a wirelessly connected mobile communication device.

Determining the level of correlation between the first micro-route and the second micro-route may include determining how much an event or sensed condition effects both of the first micro-route and the second route, and the more similar the effect the event or sensed condition has on both, the more correlated they are. As previously described, for at least some embodiments, the micro-routes between the transmitting node and the receiving node are monitored over time. That is, the performance of the micro-routes is re-characterized repeatedly over time. For at least some embodiments, the level of correlation between the different micro-routes is determined by determining variations in the performance (for example, measured link quality) between the different micro-routes over the repeated characterizations. That is, the correlation determination includes determining whether the performance of the different micro-routes changes similarly or differently over time. The more correlated different micro-routes are, the more similar the variations in the performance of the micro-routes. The less correlated the different micro-routes are, the less similar the variation in the performance of the micro-routes. Statistical processes can be used to determine the similarity or difference between different micro-routes over time by comparing the performance of the different micro-route over the repeated characterization of the performance of the different micro-routes over time.

The condition may be one or more of the following: the performance; the introduction or the elimination of one or more interfering signals; a change in network topology; a change in the physical environment around or surrounding the wireless network; the failure of a link; the signal quality.

In an embodiment according to the invention, a method may comprise characterizing a plurality of micro-routes between a first node and a second node, wherein the plurality of micro-routes includes the at least one micro-route and the at least one other micro-route, comprising directing a first beam formed by a plurality of antennas of the first node to a plurality of directions, for each of the plurality of directions of the first beam, directing a second beam formed by a plurality of antennas of the second nodes to a plurality of directions, and characterizing a link quality between the first node and the second node for each of the plurality of beam directions of the first beam and each of the plurality of beam directions of the second beam.

Characterizing the link quality may comprise determining whether the link quality is better than a threshold.

In an embodiment according to the invention, a method may comprise forming a matrix that includes the characterized link quality for each of the each of the plurality of beam directions of the first beam and each of the plurality of beam directions of the second beam.

In an embodiment according to the invention, a method may comprise identifying one or more clusters of characterized link qualities that include characterized link qualities greater than a threshold.

In an embodiment according to the invention, a method may comprise classifying the one or more clusters.

The one or more clusters may be classified as at least one of side lobes or micro-routes.

In an embodiment according to the invention, a method may comprise determining a level of correlation between each of the micro-routes.

The level of correlation may be determined based on the difference in AoD (angle of departure) at the transmitting node and AoA (angle of arrival) at the receiving node between each of the micro-routes.

In an embodiment according to the invention, a method may comprise monitoring link conditions between the first node and the second node, and re-characterizing at least a subset of the plurality of micro-routes between a first node and a second node if the monitored link conditions are determined to change by more than a threshold.

An upstream cloud server connected to the first node and the second node may perform a portion of at least one of the characterizing one or more micro-routes between the first node and the second node, or the selecting at least one other micro-route for communication between the first node and the second node.

In an embodiment according to the invention, a wireless network may comprise a first node, a second node, wherein the first node wirelessly communicates with the second node through a wireless link formed by at least one micro-route, and a controller, wherein the controller is operative to determine a condition of the at least one micro-route, and select at least one other micro-route for communication between the first node and the second node based on a level of correlation between the at least one micro-route and the at least one other micro-route after determining the condition.

In an embodiment according to the invention, a wireless network may comprise a first node, a second node, wherein the first node wirelessly communicates with the second node through a wireless link formed by at least one micro-route, and a controller, wherein the controller is operative to determine a condition of the at least one micro-route, select at least one other micro-route for communication between the first node and the second node based on a level of correlation between the at least one micro-route and the at least one other micro-route after determining the condition.

Determining the level of correlation between the first micro-route and the second micro-route may include determining how much an event or sensed condition effects both of the first micro-route and the second route, and the more similar the effect the event or sensed condition has on both, the more correlated they are.

The condition may be one or more of the following: the performance; the introduction or the elimination of one or more interfering signals; a change in network topology; a change in the physical environment around or surrounding the wireless network; the failure of a link; the signal quality.

The controller may be operative to characterize a plurality of micro-routes between a first node and a second node, wherein the plurality of micro-routes includes the at least one micro-route and the at least one other micro-route, comprising directing a first beam formed by a plurality of antennas of the first node to a plurality of directions, for each of the plurality of directions of the first beam, directing a second beam formed by a plurality of antennas of the second nodes to a plurality of directions, and characterize a link quality between the first node and the second node for each of the plurality of beam directions of the first beam and each of the plurality of beam directions of the second beam.

Characterizing the link quality may comprise determining whether the link quality is better than a threshold.

The controller may be operative to form a matrix that includes the characterized link quality for each of the each of the plurality of beam directions of the first beam and each of the plurality of beam directions of the second beam.

The controller may be operative to identify one or more clusters of characterized link qualities that include characterized link qualities greater than a threshold.

The controller may be operative to classify the one or more clusters.

The one or more clusters may be classified as at least one of side lobes or micro-routes.

The controller may be operative to determine a level of correlation between each of the micro-routes.

The controller may be operative to monitor link conditions between the first node and the second node, and re-characterize at least a subset of the one or more micro-routes between a first node and a second node if the monitored link conditions are determined to change by more than a threshold.

In a further embodiment according to the invention, one or more computer-readable non-transitory storage media embody software that is operable when executed to perform a method according to the invention or any of the above mentioned embodiments.

In a further embodiment according to the invention, a system comprises: one or more processors; and at least one memory coupled to the processors and comprising instructions executable by the processors, the processors operable when executing the instructions to perform a method according to the invention or any of the above mentioned embodiments.

In a further embodiment according to the invention, a computer program product, preferably comprising a computer-readable non-transitory storage media, is operable when executed on a data processing system to perform a method according to the invention or any of the above mentioned embodiments.

Although specific embodiments have been described and illustrated, the embodiments are not to be limited to the specific forms or arrangements of parts so described and illustrated. The described embodiments are to only be limited by the claims.

What is claimed:

1. A method, comprising:
   characterizing a plurality of micro-routes between the first node and the second node, wherein the plurality of micro-routes includes a micro-route and at least one other micro-route, comprising:
   directing a first beam formed by a plurality of antennas of the first node to a plurality of directions;
   for each of the plurality of directions of the first beam, directing a second beam formed by a plurality of antennas of the second node to a plurality of directions;
   characterizing a link quality between the first node and the second node for each of the plurality of beam directions of the first beam and each of the plurality of beam directions of the second beam;
   identifying and classifying a plurality of clusters of characterized link qualities that include characterized link qualities greater than a threshold; and
   determining a level of correlation between each of the plurality of micro-routes;
   wherein the level of correlation is determined based on a difference in AoD (angle of departure) at a transmitting node and AoA (angle of arrival) at a receiving node between each of the plurality of micro-routes;
   wherein different micro-routes are correlated when a change in a network condition changes performance of the different micro-routes similarly, and the different micro-routes are not correlated with the change in the network condition changes performance of the different micro-routes differently.

2. The method of claim 1, further comprising:
   classifying one or more of the plurality of clusters by side-lobes or by micro-route.

3. The method of claim 1, further comprising:
   communicating between the first node and the second node through a wireless link formed by a micro-route of the plurality of micro-routes;
   determining a condition of the micro-route;
   selecting another micro-route for communication between the first node and the second node based on a level of correlation between a cluster of the plurality of clusters of the one micro-route and a cluster of the plurality of clusters of the at least one other micro-route after determining the condition.

4. The method of claim 1, wherein characterizing the link quality comprises determining whether the link quality is better than a threshold.

5. The method of claim 1, further comprising forming a matrix that includes the characterized link quality for each of the each of the plurality of beam directions of the first beam and each of the plurality of beam directions of the second beam.

6. The method of claim 1, further comprising monitoring link conditions between the first node and the second node, and re-characterizing at least a subset of the plurality of micro-routes between a first node and a second node if the monitored link conditions are determined to change by more than a threshold.

7. The method of claim 1, wherein an upstream cloud server connected to the first node and the second node performs a portion of at least one of the characterizing one or more micro-routes between the first node and the second node, or the selecting at least one other micro-route for communication between the first node and the second node.

8. A wireless network, comprising:
   a controller operative to:
   characterize a plurality of micro-routes between a first node and a second node, wherein the plurality of micro-routes includes a first micro-route and the at least one other micro-route, comprising the controller operating to:
   direct a first beam formed by a plurality of antennas of the first node to a plurality of directions;
   for each of the plurality of directions of the first beam, direct a second beam formed by a plurality of antennas of the second nodes to a plurality of directions;
   characterize a link quality between the first node and the second node for each of the plurality of beam directions of the first beam and each of the plurality of beam directions of the second beam;
   identify and classify a plurality of clusters of characterized link qualities that include characterized link qualities greater than a threshold; and
   determine a level of correlation between each of the plurality of micro-routes;
   wherein the level of correlation is determined based on a difference in AoD (angle of departure) at a transmitting node and AoA (angle of arrival) at a receiving node between each of the plurality of micro-routes;
   wherein different micro-routes are correlated when a change in a network condition changes performance of the different micro-routes similarly, and the different micro-routes are not correlated with the change in the network condition changes performance of the different micro-routes differently.

9. The network of claim 8, wherein the controller is further operative to:
   classify one or more of the plurality of clusters by side-lobes or by micro-route.

10. The network of claim 8, wherein the first node wirelessly communicates with the second node through a wireless link formed by the first micro-route, wherein the controller is further operative to:
    determine a condition of the first micro-route;
    select at least one other micro-route for communication between the first node and the second node based on a level of correlation between the first micro-route and the at least one other micro-route after determining the condition.

11. The network of claim 8, wherein characterizing the link quality comprises determining whether the link quality is better than a threshold.

12. The network of claim 8, wherein the controller is further operative to form a matrix that includes the characterized link quality for each of the each of the plurality of beam directions of the first beam and each of the plurality of beam directions of the second beam.

13. The network of claim 8, further comprising monitoring link conditions between the first node and the second node, and re-characterizing at least a subset of the plurality of micro-routes between a first node and a second node if the monitored link conditions are determined to change by more than a threshold.

14. The network of claim 8, wherein an upstream cloud server connected to the first node and the second node performs a portion of at least one of the characterizing one or more micro-routes between the first node and the second node, or the selecting at least one other micro-route for communication between the first node and the second node.

* * * * *